US009860747B2

(12) United States Patent
Pallen et al.

(10) Patent No.: US 9,860,747 B2
(45) Date of Patent: Jan. 2, 2018

(54) SYSTEM AND METHOD FOR CLOUD SYNCHRONIZING KNOWN NETWORKS

(71) Applicant: APPLE INC., Cupertino, CA (US)

(72) Inventors: Vinesh Pallen, Sunnyvale, CA (US); Kapil Chhabra, Milpitas, CA (US); Artiom Shamis, Los Gatos, CA (US); Tito Thomas, San Jose, CA (US)

(73) Assignee: APPLE INC., Cupertino, CA (US)

( * ) Notice: Subject to any disclaimer, the term of this patent is extended or adjusted under 35 U.S.C. 154(b) by 730 days.

(21) Appl. No.: 13/912,926

(22) Filed: Jun. 7, 2013

(65) Prior Publication Data

US 2014/0362835 A1 Dec. 11, 2014

(51) Int. Cl.
*G06F 21/10* (2013.01)
*H04W 12/06* (2009.01)
*H04W 12/04* (2009.01)
*H04W 84/12* (2009.01)

(52) U.S. Cl.
CPC ........... *H04W 12/06* (2013.01); *H04W 12/04* (2013.01); *H04L 2463/062* (2013.01); *H04W 84/12* (2013.01)

(58) Field of Classification Search
CPC ... H04L 63/107; H04L 63/104; H04L 63/102; H04L 63/083; H04L 67/06; H04W 12/08
See application file for complete search history.

(56) References Cited

U.S. PATENT DOCUMENTS

| 6,272,545 | B1 * | 8/2001 | Flanagin | G06F 8/61 709/201 |
| 7,143,153 | B1 * | 11/2006 | Black | H04L 41/0681 709/220 |
| 2009/0205028 | A1 * | 8/2009 | Smeets | G06F 21/445 726/6 |
| 2010/0174912 | A1 * | 7/2010 | West | G06F 17/30575 713/183 |
| 2012/0207056 | A1 * | 8/2012 | Ree | H04W 8/245 370/254 |
| 2013/0058274 | A1 * | 3/2013 | Scherzer | H04W 12/08 370/328 |
| 2014/0281540 | A1 * | 9/2014 | Brouwer | H04L 9/12 713/169 |

* cited by examiner

*Primary Examiner* — Eleni Shiferaw
*Assistant Examiner* — Paul Callahan
(74) *Attorney, Agent, or Firm* — Fay Kaplun & Marcin, LLP

(57) ABSTRACT

A system and method synchronizes network data for a device registered to a user. The network data includes a list of a plurality of known wireless networks and authentication data associated with each of the known wireless networks. The method includes establishing a connection to a server of a synchronization network. The method includes transmitting identification data to the server. The identification data indicates the network data corresponding to the user to which the device is registered. The method includes receiving the list of known wireless networks from the server via the synchronization network. The method includes receiving a secure file including the authentication data from the server via the synchronization network.

20 Claims, 5 Drawing Sheets

SYSTEM AND METHOD FOR CLOUD SYNCHRONIZING KNOWN NETWORKS

BACKGROUND INFORMATION

A station may be configured to establish a connection with a wireless network. There are many different manners that the station may automatically join a wireless network when multiple wireless networks are available for connection; some wireless networks may require some form of authentication, such as a password. When a user has a station that initially associates with a wireless network that requires a password, the user may be required to provide the password to establish the connection. When the user utilizes more than one station, each initial time that each station establishes a connection to a wireless network, the user may be required to provide the password for the wireless network. This may have the result that the user is required to enter the same password for the same network multiple times, once for each of the user's stations. Improvements in this area (and related areas) would be desirable.

DETAILED DESCRIPTION

Figure 1:
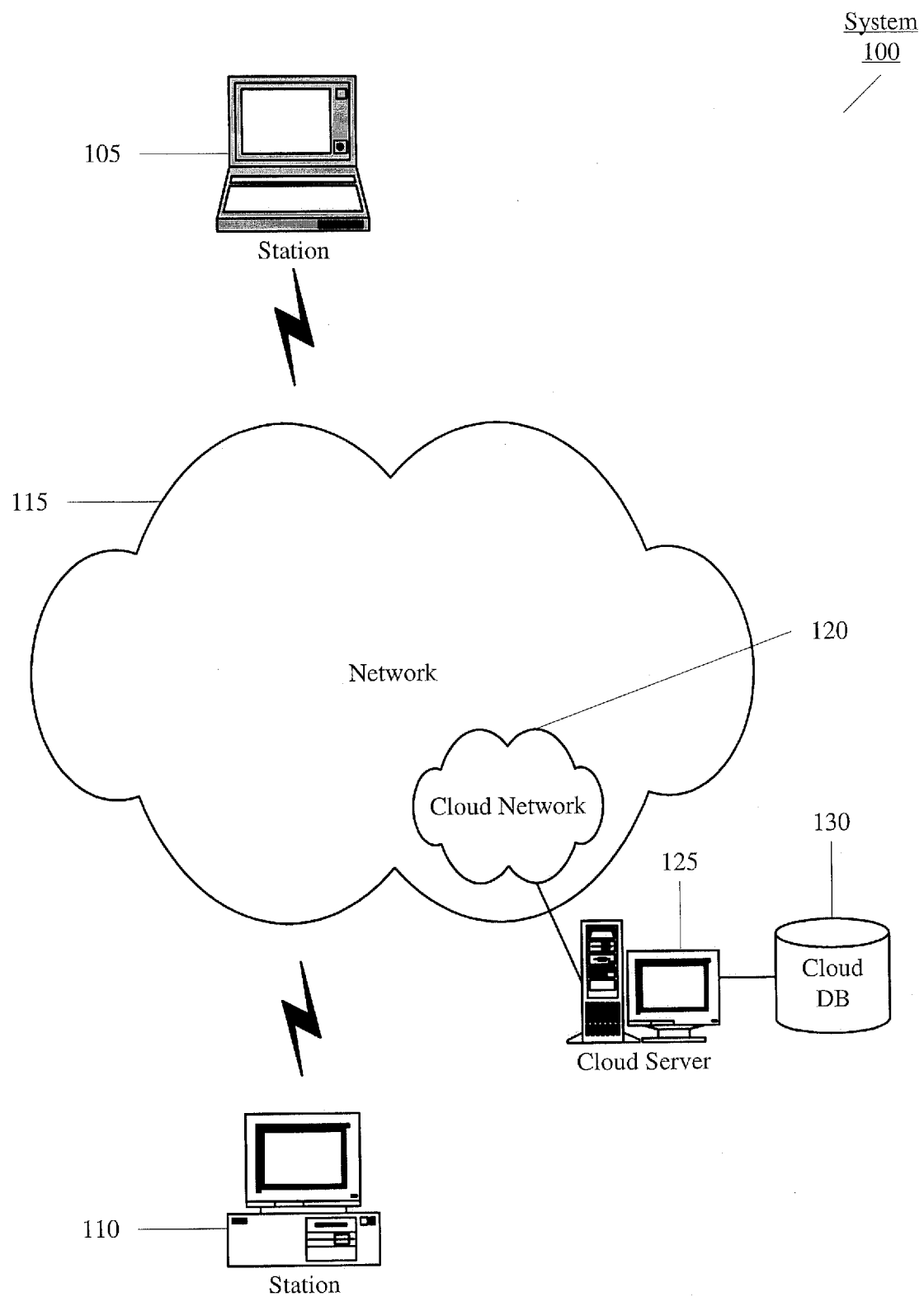
FIG. 1 shows an exemplary system for synchronizing known wireless networks.

The exemplary embodiments relate to a system and method for synchronizing network data. The method comprises receiving, by a server of a synchronization network, network data from a first station registered to a user, the network data including: a list of a plurality of known wireless networks, wherein the known wireless networks include IEEE 802.11 networks, and wherein the list includes a plurality of service set identifiers (SSIDs), each SSID corresponding to a respective one of the known wireless networks, and authentication data associated with each of the known wireless networks, wherein the authentication data includes a plurality of passwords, each password corresponding to a respective one of the known wireless networks; determining, by the server, a second station registered to the user that is to be synchronized with the network data; transmitting, by the server, the list of known wireless networks to the second station via the synchronization network; generating a secured file including the authentication data; and transmitting, by the server, the secured file including the authentication data to the second station via the synchronization network.

The exemplary embodiments may be further understood with reference to the following description and, the related appended drawings, wherein like elements are provided with the same reference numerals. The exemplary embodiments are related to a system and method for synchronizing wireless network data between a plurality of stations. Specifically, known wireless networks with which the stations have previously associated are stored in a cloud network such that one of the stations may synchronize its network data with network data of a further one of the stations. Furthermore, restricted data such as authentication data including passwords used to authorize a connection to the wireless network are synchronized and properly associated with the wireless network such that an automatic connection may be performed with a station that has never previously associated with a wireless network stored in the cloud network. The known wireless networks may be WiFi networks (which may be based on, for example, IEEE 802.11a/b/g/n/ac technology, and/or any other appropriate IEEE 802.11 technology), and/or any other type of wireless network. The synchronizing, the wireless networks, data thereof, the stations, the associations, the authentication data, and related methods for synchronizing network data via the cloud network will be explained in further detail below.

It should be noted that the terms "joining," "connecting," and "associating" are used interchangeably in the description below. Specifically, these terms relate to when the station joins a wireless network. Those skilled in the art will understand that when the station joins a wireless network, an association process is performed in order for the station to connect to the wireless network. Those skilled in the art will also understand that any manner of association process may be used and the exemplary methods encompass any form of association or procedure in which the station is to connect to the wireless network.

It should also be noted that the description below uses the term "cloud network." However, the cloud network is only exemplary. Those skilled in the art will understand that the cloud network represents any synchronization network in which data is to be synchronized across at least one station.

When a user has access to multiple stations, the user may wish to synchronize data between the multiple stations. A cloud network may be provided such that cloud data is stored thereon for each of the stations to share this data among the stations. Thus, when a station connects to the cloud network, the cloud data may be retrieved and stored locally on the station. The exemplary methods further enable the cloud network to store wireless network data to be shared among the stations. Accordingly, when a single station associates with a wireless network, network data related to the association with this wireless network may be stored in the cloud data of the cloud network. A further station that has never associated with this wireless network may be able to automatically connect to this wireless network without manually providing any authentication (e.g., password) if the further station has synchronized its data via the cloud network.

The exemplary methods further provide network data synchronization that is usable by all the stations, regardless of the platform being used. Those skilled in the art will understand that with wireless networks, particularly custom network specific certificates, ad hoc network setups may be used for the specific station. The cloud network may be configured to store the network data and passwords in a cloud format and to convert the network data and passwords into the appropriate manner for the format of the station. In this way, the stations may be able to perform an automatic association with a known wireless network if any of the stations has associated with the wireless network previously. With regard to the passwords being synchronized, those skilled in the art will understand that, in some instances, a different path or implementation may be required for handling passwords (as opposed to the path/implementation required for handling network parameters), as password data may be considered more restrictive and more sensitive. For example, an encryption scheme may be required. As network data to be synchronized among multiple stations may be, in some instances, not considered as valuable without having the associated passwords, the exemplary methods provide for the passwords to also be synchronized among the stations. The passwords described herein may be associated with any appropriate security and/or authentication technology, including but not limited to Wi-Fi Protected Access (WPA), WPA2, Wired Equivalent Privacy (WEP), and/or any other security and/or authentication technology.

FIG. 1 shows an exemplary system 100 for synchronizing known wireless networks. The system 100 relates to when a cloud network is utilized to synchronize data between stations. For example, a first station may provide data (e.g., network data) that is converted into cloud data in the cloud network such that the cloud data is converted to a format of a second station that is then able to obtain the data of the first station. The network data that is to be synchronized among the stations may include wireless network identities and associated authentication data (e.g., passwords). Specifically, the wireless network identities may be embodied as network metadata that includes only the most necessary meta information of a network as those skilled in the art will understand. According to an exemplary meta information included in the wireless network identities, it may include a service set identifier (SSID), access point (AP) Mode, a marker indicating whether the network is hidden or not, authentication mode, authentication Flag, etc. The system 100 may include a network 115 that provides access to a cloud network 120 for a mobile station 105 and a terminal station 110. The cloud network 120 may be administered by a cloud server 125 utilizing a cloud database 130.

The stations 105, 110 may represent at least two electronic devices that belong to a user. For example, the stations 105, 110 may be two different electronic devices that are portable such as a mobile phone, a personal digital assistant, a smartphone, a tablet, a laptop, a barcode reader, etc. In another example, the station 105 may be a portable electronic device while the station 110 may be a stationary electronic device such as a desktop terminal, embedded devices, etc. Cloud data may be stored in the cloud network 120 that is respective of the user. Through a registration process, the mobile station 105 and the terminal station 110 may be associated with the user and the cloud data. As a portable electronic device, the station 105 may be a handheld device that allows the user to move the station 105 from location to location. In particular, the station 105 may be moved to various operating areas of wireless networks. When the station 105 associates with wireless networks, the station 105 may store network data corresponding to each wireless network that is joined. The network data may be stored in a format based upon a platform of the station 105. As discussed above, the network data may include wireless network identities and associated authentication data. The station 105 (whether portable or stationary) may also associate with wireless networks. Therefore, the station 110 may also store network data corresponding to each wireless network that is joined. The network data may be stored in a format based upon a platform of the station 110.

It should be noted that the system 100 including the station 105 and the station 110 is only exemplary. That is, any number of stations may be registered with a user. Accordingly, all the stations that are registered with the user may also be associated with the same cloud data in the cloud network.

It should also be noted that the cloud network requiring at least one station associated with cloud data for the user is only exemplary. The exemplary system and method may be configured such that an unregistered station may be used or an administrator of the cloud network may provide inputs such that cloud data is maintained. For example, a user may utilize a station that is not associated with the user to access the cloud network of the user. The user may manually enter network data that the user wishes to synchronize with registered stations at a future time. Accordingly, the cloud data being provided by a station registered with the user is not required.

Figure 2:
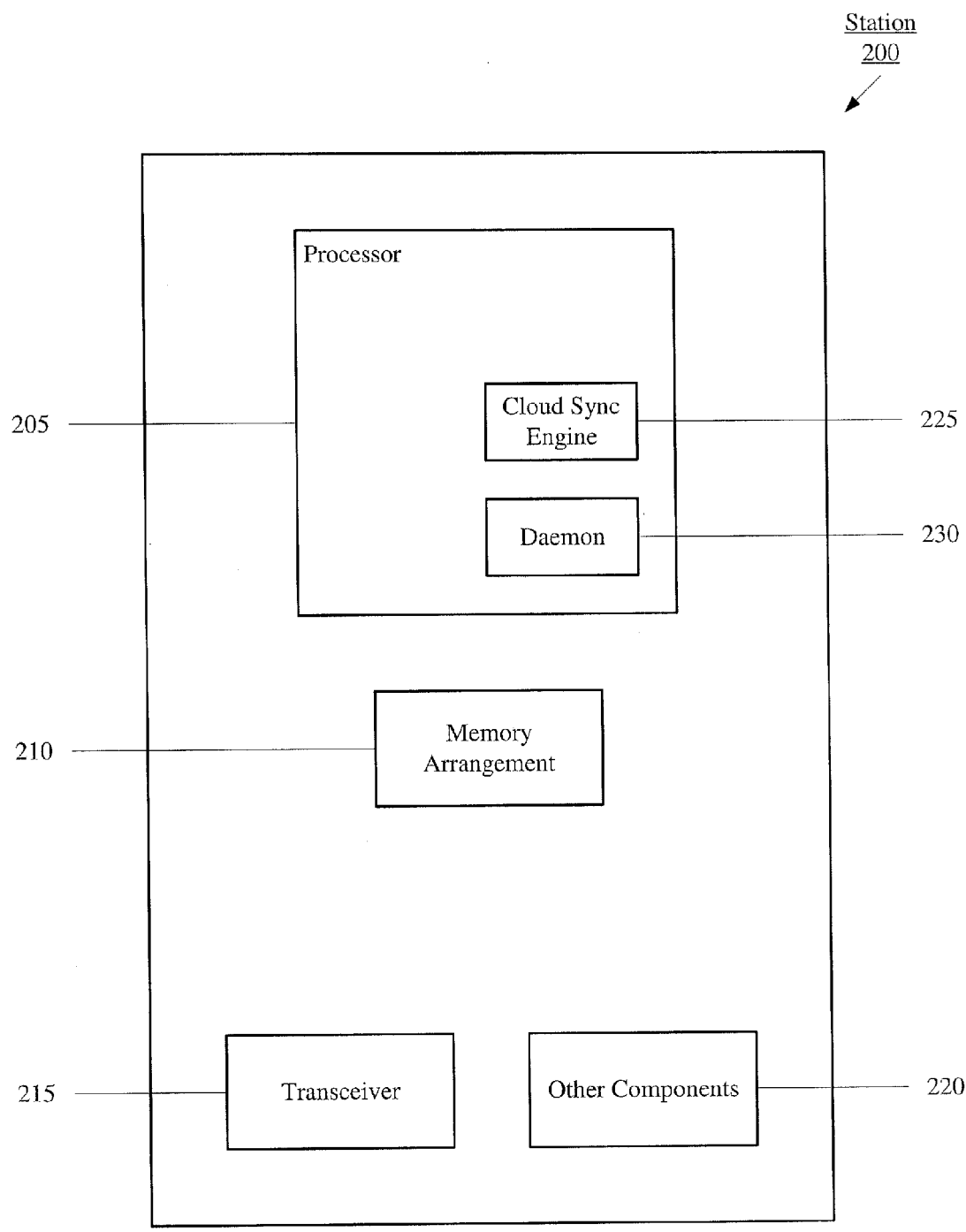
FIG. 2 shows an exemplary station configured to synchronize network data via a cloud network.

FIG. 2 shows an exemplary station 200 configured to synchronize network data via a cloud network. Specifically, FIG. 2 illustrates exemplary components that may be included with the station 200. The station 200 may represent any electronic device that is associated with the user. For example, the station 200 may be the stations 105, 110 which may be portable or stationary. The station 200 may include a processor 205, a memory arrangement 210, a transceiver 215, and other components 220. For example, the other components 220 may include a portable power supply (e.g., battery) if the station 200 is portable, a data acquisition device, ports to electrically connect the station 200 to other electronic devices, a display device, an input/output device, etc.

The processor 205 may be configured to execute a plurality of applications of the station 200. For example, the applications may include a web browser when connected to a communication network via the transceiver 125. In another example, the processor 205 may execute a synchronization application to synchronize data stored on the station with cloud data stored in a cloud network. The memory 210 may be a hardware component configured to store data related to operations performed by the station 200. Specifically, the memory 210 may store network data (e.g., wireless network identities and associated passwords) related to wireless networks to which the station 200 has previously connected along with associated authentication data.

The transceiver 215 may be a hardware component configured to transmit and/or receive data. The transceiver 215 may therefore enable communication with other electronic devices directly or indirectly through a network. Specifically, the transceiver 215 may be configured to transmit network data stored in the memory 210 to the cloud network or receive network data stored in the cloud network.

The processor 205 may further be configured to execute a cloud sync engine 225 and a daemon 230. The cloud sync engine 225 may be a portion of the synchronization application executed by the processor 205. The cloud sync engine 225 may be configured to generate data packets for transmission to the cloud network. The cloud sync engine 225 may also be configured to receive data packets from the cloud network. Specifically, the data packets may relate to the network data for wireless networks that are to be synchronized across stations registered with the user. As will be described in further detail below, the cloud sync engine 225 may provide the synchronization feature for a list of known wireless networks as well as associating authentication data for each of the known wireless networks. The cloud sync engine 225 may further be configured to convert the network data that is received in a cloud format into the format used by the station 200 based upon the platform used by the station 200. The daemon 230 may be a disk and execution monitoring tool that may be a virtual drive or optical disk authoring program associated with the synchronization application, and more specifically to the cloud sync engine 225.

Returning to FIG. 1, the network 115 may be any wireless communications network that enables data to be exchanged between electronic devices. For example, the network 115 may be a WAN, a LAN, a VLAN, a WiFi network (which may be based on, for example, IEEE 802.11a/b/g/n/ac technology, and/or any other appropriate IEEE 802.11 technology), a private network, etc. Specifically, the network 115 enables the stations 105, 110 to establish a connection to the cloud network 120. Thus, the network 115 may provide a gateway for the stations 105, 110 (and all other stations registered to the user) to connect to the cloud network 120 that is associated with the user.

It should be noted that the network 115 providing the data exchange functionality for both the stations 105, 110 is only exemplary. Those skilled in the art will understand that the station 105 and the station 110 may utilize respective, different networks to connect to the cloud network 120. For example, the station 105 may connect to the cloud network 120 via a first wireless network while the station 110 may connect to the cloud network 120 via a second wireless network. It should also be noted that the station 105 and the station 110 connecting directly to the cloud network 120 via the network 115 is only exemplary. Those skilled in the art will understand that the station 105 or the station 110 may require more than one network to ultimately connect to the cloud network 120. For example, the station 105 may connect to a wireless network that provides a gateway to a further wireless network that provides a gateway to the cloud network 120.

The cloud server 125 may be configured with hardware and software components associated with administering a network, specifically the cloud network 120. According to the exemplary methods, the cloud server 125 is further configured to provide the synchronization of the cloud data with the stations 105, 110 (and all other stations registered with the user). The cloud data may be stored on the cloud database 130 that may be a hardware component configured to store the data for the cloud server 125. The cloud data may also be stored in the cloud database 130 in a platform independent cloud format. The cloud format will be discussed in further detail below. The cloud data may be stored such that it is associated with a particular user. Thus, user data may be stored in the cloud database 130 that links the user to the respective cloud data. The user data may also be associated with one or more stations that are registered to the user. For example, the stations 105, 110 may both be registered to a single user. In this manner, the user, the stations, and the cloud data are all linked to each other.

It should be noted that the cloud server 125 may be any network component configured to provide the cloud network 120 and the functionalities thereof. For example and illustrated in FIG. 1, the cloud server 125 may be a separate network component. In another example, the functionalities of the cloud server 125 may be embodied in another network component such as within a network server of the network 115. Therefore, the cloud server 125 may be any component or portion thereof that provides a synchronization functionality while the cloud network 120 may be any network or associated with any network that enables a station to connect to the cloud server 125.

As will be described in further detail below, the cloud server 125 may be configured to store the cloud data in a cloud format. The cloud format may be a platform independent format utilized by the cloud server 125 to store the cloud data. Accordingly, when a station is to be synchronized with the cloud data, the cloud server 125 may be configured to transmit the cloud data via the cloud network 120 to the station (e.g., station 200). The cloud sync engine 225 of the station 200 may be configured to convert the cloud data in the cloud format into a respective format that is utilized by the station 200. For example, the station 105 may utilize a first format (e.g., iOS) while the station 110 may utilize a second format (e.g., MacOS). To properly synchronize the cloud data to the station, the station must be capable of interpreting the cloud data in a format that is readable by the processor of the station. Accordingly, the cloud sync engine 225 may be configured for this functionality. As each station associated with the cloud network 120 includes the cloud sync engine 225, the platform independent cloud format allows for any station to receive the cloud data. Those skilled in the art will understand that the cloud sync engine 225 may be an application that is installed on the station (e.g., stored in the memory 210 and executed by the processor 205).

It should be noted that the description below relates to the cloud sync engine 225 being configured to perform the conversion of network data in the cloud format into the appropriate format used by the station. That is, the cloud server 125 is only configured to transmit the network data in the cloud format. However, this functionality being performed by the cloud sync engine 225 is only exemplary. For example, the cloud server 125 may be configured to transmit the cloud data to each of the stations in the appropriate format utilized by a platform of the station. Accordingly, the station may receive the network data already converted into the appropriate format of the station. A processor of the cloud server 125 may therefore be configured to convert the cloud data in the cloud format to the format utilized by the station. In another example, the cloud server 125 may be configured to transmit the cloud data in the cloud format to an intermediary component (not shown) such as a network component of the network 115 being utilized by the station to connect to the cloud network 120. The intermediary component may be configured to convert the cloud data in the cloud format to the appropriate format utilized by the station. Therefore, neither the station nor the cloud server 125 may be configured for this functionality.

The exemplary methods provide a manner of synchronization for known wireless networks to be shared among a plurality of stations. For example, the station 105 may have previously associated with a plurality of wireless networks and stored the identity of these wireless networks and any associated authentication data locally. When the station 105 connects to the cloud network 120, the network data may be stored in the cloud database 130 in the cloud format. Subsequently, if the user registers the station 110 with the cloud network 120 and the station 110 has connected to the cloud network 120, the station 110 may receive the network data. The synchronization may take place in a two-step process. A first process may be receiving the identities of the wireless networks. A second process may be a more secure synchronization phase in which the passwords for the wireless networks are received. Depending on the manner in which the passwords are transmitted, a possible third process may also be a secured synchronization phase in which the cloud server 125 may provide the station 110 with association data such that the passwords received in the second process may be interpreted by the processor of the station to properly link the passwords to the respective wireless networks.

Figure 3:
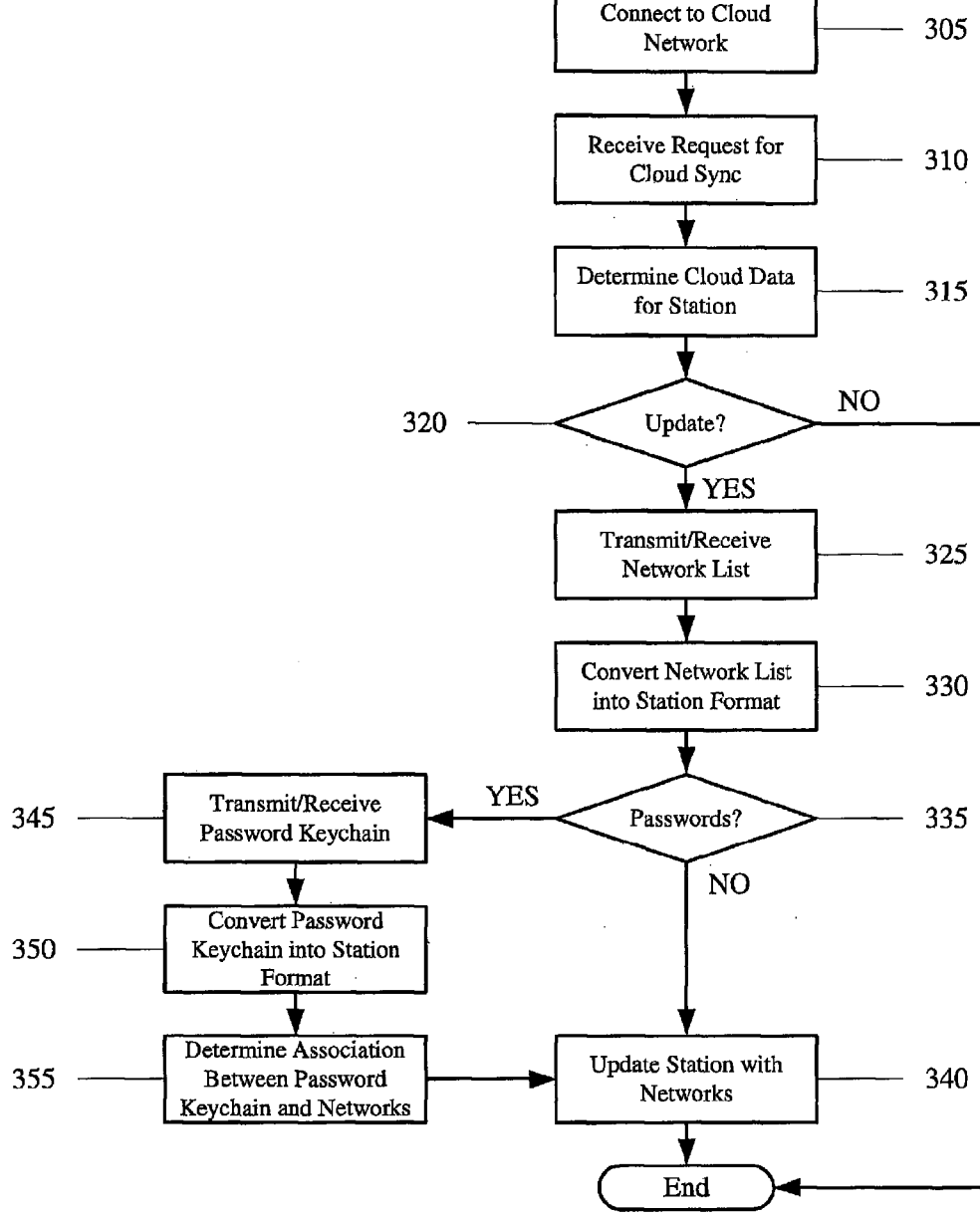
FIG. 3 shows an exemplary first method for synchronizing network data via a cloud network.

FIG. 3 shows an exemplary method 300 for synchronizing network data via a cloud network. The method 300 illustrates a process in which a station connects to the cloud server 125 via the cloud network 120 via the network 115.

The method 300 further illustrates a manner in which the cloud data stored in the cloud database 130 is synchronized such that the cloud data is stored in the station. The method 300 also relates to a general process for synchronizing data in which the station is to retrieve additional data that is stored in the cloud network 120 and store this data locally in the local memory arrangement. Other changes to cloud data and subsequent processes of synchronization will be described in further detail with regard to FIG. 5. The method 300 will be described with regard to the system 100 of FIG. 1 and the station 200 of FIG. 2.

It should be noted that the method 300 may assume that the station that is to synchronize has already been registered with a user. As discussed above, the registration of the station may indicate a plurality of electronic devices that are associated with a particular user. Thus, in a preliminary step, the user may log into a cloud application and provide identity data of a new station. The user may log into the cloud application using a variety of means such as those discussed above. The station may then be registered with the user.

In step 305, the station connects to the cloud network. As described above, the station may connect to the cloud network using a variety of manners. In a first example, the station 105 may initially establish a connection to the network 115. The network 115 may provide a gateway to the cloud network 120, thereby establishing a connection to the cloud server 125 and the cloud database 130. In a second example, the station 110 may establish a connection to a first network (not shown) that provides a gateway to the network 115. Subsequently, the network 115 may provide a gateway to the cloud network 120.

In step 310, the cloud server 125 may receive a request transmitted by the station for synchronization of the cloud data stored in the cloud database. The request may be any data packet that indicates that the station is to synchronize with the cloud data. In step 315, the respective cloud data stored in the cloud database 130 is determined by the cloud server 125. The data packet previously transmitted with the request or a separate data packet may indicate an identity of the station. The identity of the station may be used to determine the cloud data that is to be used for synchronization with the station. It should be noted that any manner of identifying the cloud data respective of the station may be used. For example, upon establishing a connection with the cloud network 120, the user may be required to provide identification and authentication information such that the user logs into the cloud network. This data may be used to identify the cloud data to be used for synchronization.

In step 320, a determination is made whether the station requires synchronization with the cloud data. Upon establishing a connection with the cloud server 125, the cloud server 125 may request a data packet that indicates the relevant data stored locally in the memory arrangement 210 of the station 200. The relevant data may relate to data that is synchronized across a plurality of stations via the cloud network 120. With regard to the exemplary methods, the relevant data may include wireless network data. The cloud server 125 may perform a comparison of the relevant data that is stored locally in the memory arrangement 210 with the cloud data stored in the cloud database 130. If there is no discrepancy between the locally stored data and the cloud data, the cloud server 125 determines that no change is required. Thus, the method 300 ends. It should be noted that the data packet including the relevant data used for synchronization may be formatted by the cloud sync engine 225 prior to transmission to the cloud server 125. For example, the format may be selected in a manner that a comparison to the cloud data in the cloud format may be performed.

If the cloud server 125 determines that the cloud data stored in the cloud database 130 and the locally stored data in the memory arrangement 210 are different, the method 300 continues to step 325. In step 325, the cloud data in the cloud format including the known wireless networks is transmitted by the cloud server 125 and received by the station. In step 330, the cloud sync engine 225 converts the cloud data, particularly the wireless network data, into a format that is associated with a platform utilized by the station. As discussed above, the station may utilize a platform that requires a particular format of the cloud data to be properly interpreted. Thus, the cloud sync engine 225 may convert the data accordingly. It should again be noted that the cloud sync engine 225 performing the conversion is only exemplary.

According to the exemplary methods, the list of known wireless networks may be synchronized via the cloud sync engine 225 of the station 200. The cloud sync engine 225 may receive the known wireless networks of the cloud data in the cloud format and convert the cloud data to a format utilized by the platform of the station 200 to determine the network data synchronization. For example, the cloud sync engine 225 may utilize a key value storage (KVS). The KVS may be substantially similar to a local user defaults database but the values thereof that are placed in the KVS are available to every instance of a synchronization application across devices registered to a particular user. If one instance of the synchronization application changes a value, the other instances may see that change and use it to update its configuration.

As discussed above, the cloud sync engine 225 performing the conversion is only exemplary. The cloud server 125 may also be configured to convert the cloud data in the cloud format into the format utilized by the platform of the station. Accordingly, step 325 and step 330 may be reversed. That is, the cloud data including the network list may be transmitted by the cloud server 125 and received by the station 200 after the conversion is performed. Thus, the cloud server 125 may perform the conversion to the format associated with the platform utilized by the station 200.

In step 335, a determination is made whether passwords are associated with any of the known wireless networks of the cloud data. In a first example, the cloud server 125 may perform this determination. As discussed above, authentication data such as passwords may also be stored in the cloud database 130. The cloud server 125 may access the authentication data and association data that indicates a correlation between each password and the respective known wireless network, thereby being aware of any passwords. In a second example, the cloud sync engine 225 may include a feature that instructs each of a set of passwords to be synchronized with its respective known wireless network. If there are no passwords, the method 300 continues to step 340 which is discussed below.

According to the exemplary methods, the passwords may be stored in a secured file such as a keychain. The keychain is a proprietary file including the various passwords that are associated with the known wireless networks used with the MacOS platform. The keychain may be encrypted or may rely upon a cipher such that the actual passwords may be extrapolated therefrom. The keychain is a very secured mechanism such that storage of the keychain utilizes a different process from that used for network parameters (e.g., wireless network identities). The cloud server 125 or the cloud sync engine 225 may be configured to decrypt or translate the keychain such that the individual passwords may be extracted. Furthermore, the keychain or a separate data packet may include association data such that each password is properly associated with its respective known wireless network. For example, a location and a length in the keychain may indicate an individual password. An indication may further provide that the location and the length is associated with a particular known wireless network.

It should be noted that the description below uses the term "keychain" to represent any data file that includes the authentication data (e.g., passwords). However, the term "keychain" is only exemplary and those skilled in the art will understand that this term may be any data file using any format in any configuration to include the authentication data.

Those skilled in the art will understand that authentication data such as passwords require a higher standard of security. Accordingly, a conventional synchronization process may be inadequate or incapable of properly providing a synchronization for this type of data. The exemplary methods provide an intermediary application for the keychain to be synchronized. The intermediary application may be, for example, an AirPortSync to securely transport and manage authentication data in the cloud data and as utilized by the cloud sync engine 225. When synchronization occurs in the exemplary methods, the cloud sync engine 225 may receive network data including known wireless networks from the cloud server 125 and store the list of known wireless networks via KVS. The authentication data for the known wireless networks may be received using the AirPortSync application in which an "AirPort" group (e.g., authentication data) is copied to the AirPortSync application. The known wireless networks and the authentication data of the AirPortSync may be known as data to be synchronized by having an attribute that so indicates. For example, each wireless network and the keychain may include the attribute "Syncable." In this manner, the keychain may also be synchronized via a secured manner.

Thus, returning to step 335 of the method 300, if there are passwords, the method 300 continues to step 345. In step 345, the keychain in the cloud format is transmitted from the cloud server 125 to the station 200. As discussed above, the AirPortSync application may be utilized for the secure transmission/reception of the keychain. In step 350, the cloud sync engine 225 converts the keychain from the cloud format into the format utilized by the platform of the station. In step 355, the cloud sync engine 225 may determine the association between the passwords included in the keychain with the respective known wireless network of the list received in step 325.

Whether the keychain is transmitted in steps 345-355 or if no passwords exist, the method 300 continues to step 340. In step 340, the station updates its locally stored network data with the cloud data. If no passwords exist, the station simply updates the network data with the list of known wireless networks based upon the list received in step 325. If passwords do exist, the station updates the network data with the list from step 325 and the passwords of the keychain that were securely received from step 345 and associated accordingly in step 355. Therefore, the station may synchronize the network data included in the cloud data of the cloud network 120 in such a way that the list of known wireless networks is received in a first process and associated authentication data is securely received in a second process.

Figure 4:
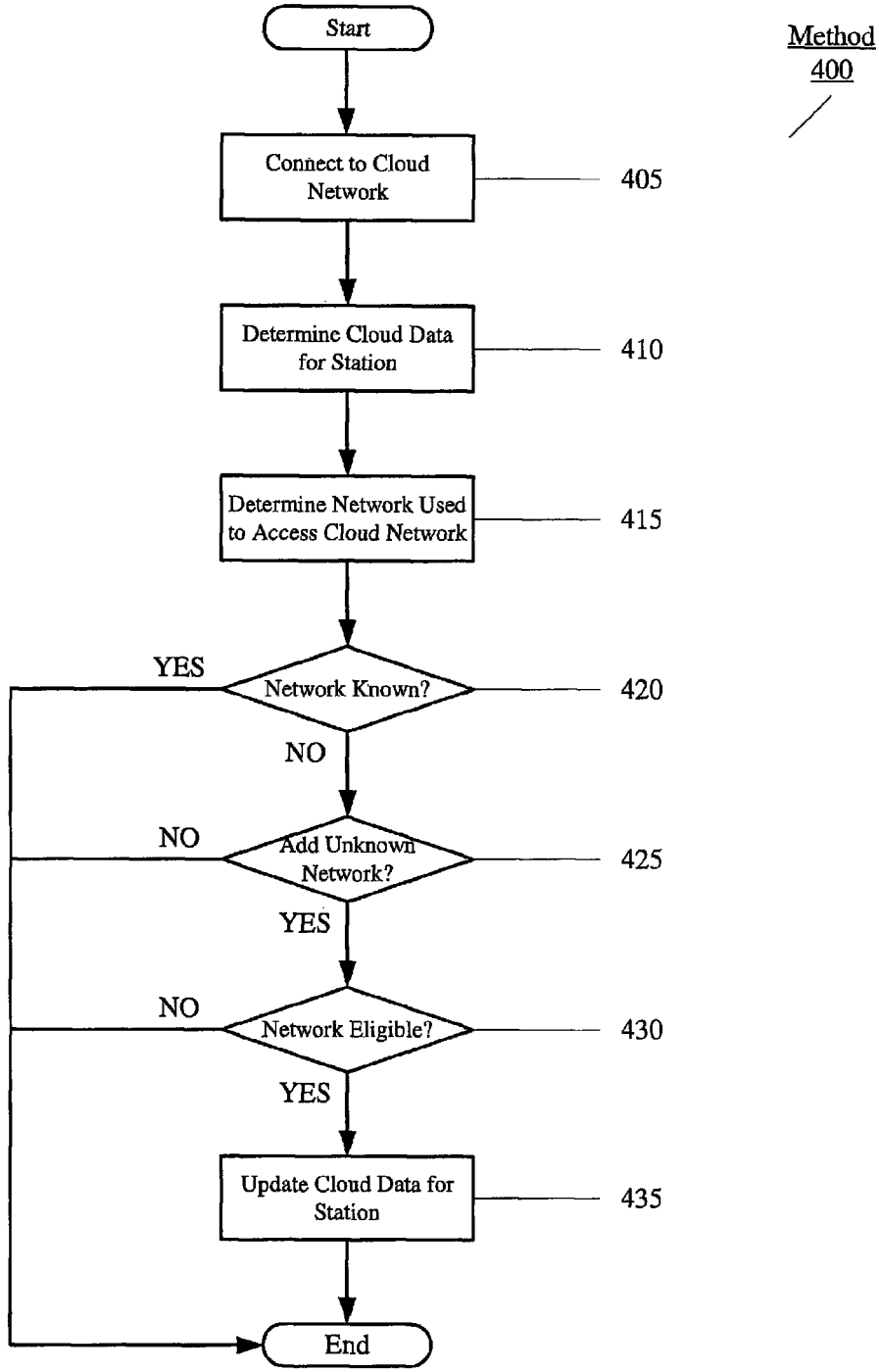
FIG. 4 shows an exemplary second method for adding a new network to network data of a cloud network.

FIG. 4 shows an exemplary second method 400 for adding a new network to network data of a cloud network. The method 400 illustrates a process in which the network data of the cloud data in the cloud network 120 is updated with a new wireless network that is unknown. In a specific example, the method 400 may relate to when a new station that is registered to the user is connecting to the cloud network and the network utilized to connect to the cloud network. It should again be noted that it may be assumed that the station may already be registered with the particular user. The method 400 will be discussed with reference to the system 100 of FIG. 1 and the station 200 of FIG. 2.

In step 405, the station 200 connects to the cloud network. In a particular example, the station 200 may be a newly registered electronic device for the user. In such an example, the station 200 has not yet synchronized with the cloud data and may also have no network data associated therewith other than the network being utilized to connect to the cloud network. In step 410, the cloud server 125 determines the cloud data associated with the station and the user.

In step 415, the cloud server may receive the network data of the station 200 to determine the network being used to access the cloud network 120. In step 420, a determination is made whether the network being used by the station 200 is already a known wireless network for the user. The cloud server 125 may compare the network being used with the network data of the cloud data to determine if this network being used is already included in the cloud data. If the network being used is known or part of the cloud data, the method 400 ends. If the network being used is not a known wireless network, the method 400 continues to step 425.

In step 425, the cloud server 125 may determine whether the network being used (i.e., unknown network) is to be added to the cloud data. It should be noted that other manners of indicating whether the unknown network should be added may be used. For example, the user may provide an input that the unknown network is to be added to the network data of the cloud data. In another example, the user may select a setting that indicates that all networks being utilized by any station registered to the user is to be added. If the unknown network is not to be added, the method 400 ends. If the unknown network is to be added, the method 400 continues to step 430. In step 430, a determination is made whether the unknown network is eligible to be added to the network data of the cloud data. There may be a variety of factors to be considered when determining whether the unknown network is eligible. For example, the unknown network may be a wireless network that has privacy settings that provide an indication to the cloud server 125 that this unknown network is never to be added to cloud data. In another example, the unknown network may be a public wireless network in which the cloud server 125 may determine that the inclusion of this unknown network is unnecessary. If the unknown network is ineligible, the method 400 ends. If the unknown network is eligible, the method 400 continues to step 435.

In step 435, the network data of the cloud data is updated with the unknown network. It should be noted that once this unknown network is included in the network data of the cloud data, it becomes a known wireless network. The cloud sync engine 225 may convert data associated with the unknown network into the cloud format for storage with the cloud data in the cloud database 130. The cloud server 125 may also receive the password associated therewith and append the password to the keychain via the AirPortSync application.

Figure 5:
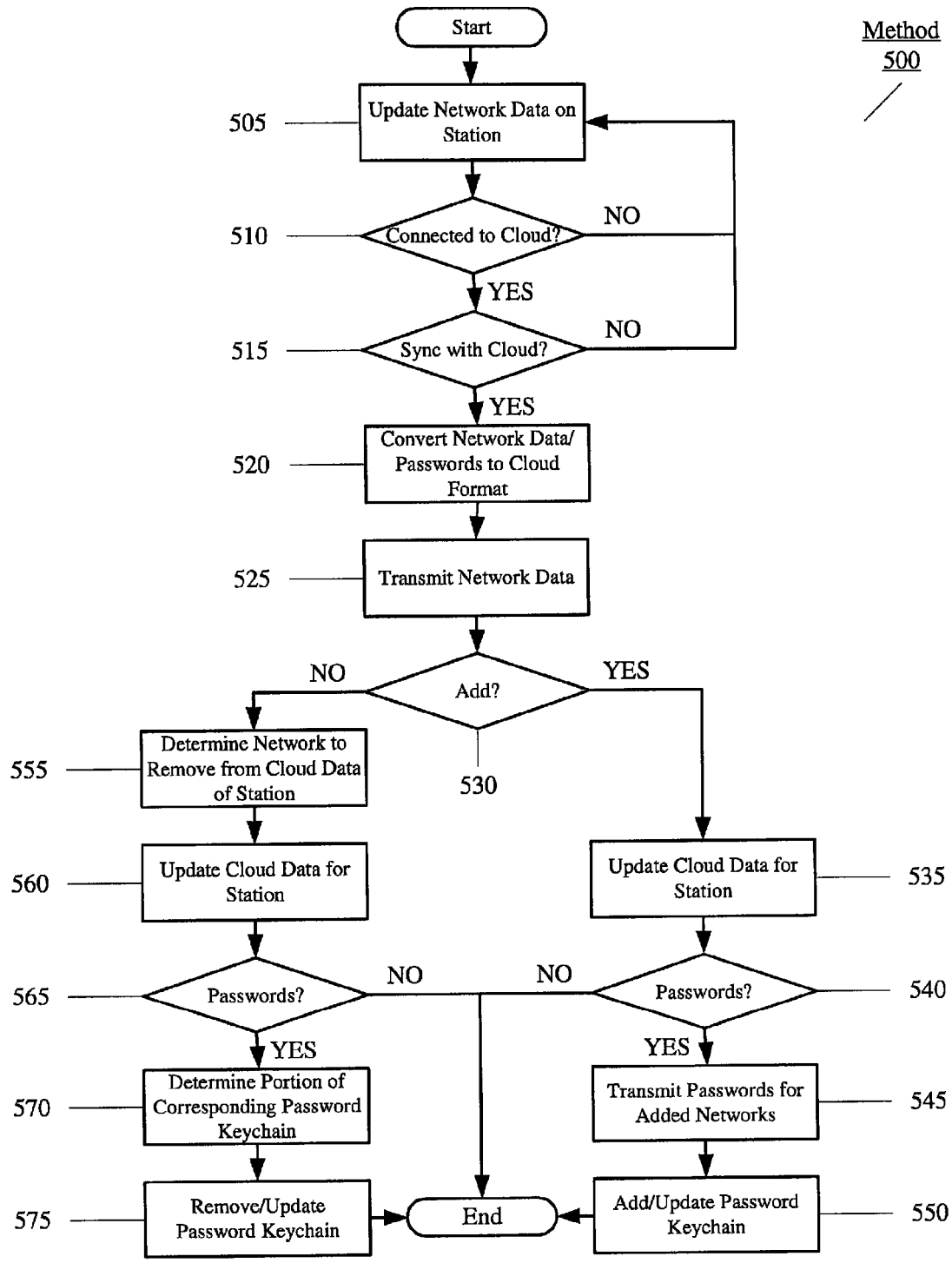
FIG. 5 shows an exemplary third method for updating network data of a cloud network.

FIG. 5 shows an exemplary third method 500 for updating network data of a cloud network. The method 500 illustrates a process in which the network data of the cloud data is updated. The updating of the network data may entail an addition or a removal of a wireless network. It should be noted that it may be assumed that the station is already registered with a particular user. The method 500 will be described with reference to the system 100 of FIG. 1 and the station 200 of FIG. 2.

In step 505, the station 200 updates network data stored locally in the memory arrangement 210. The station 200 may store all wireless network data upon establishing a connection with any wireless network. For example, the identity of the wireless network and associated authentication data may be stored in the memory arrangement 210. Thus, when the station 200 connects to a first wireless network, the identity and authentication data may be stored locally; when the station 200 connects to a second wireless network, the identity and authentication data may be stored locally; etc.

In step 510, a determination is made whether the station 200 is connected to the cloud network 120. When the station 200 connects to a wireless network, the station 200 is not necessarily also connected to the cloud network 120. Only when the station 200 has established a connection to the cloud network 120 is a synchronization process enabled. Thus, if the station 200 is not connected to the cloud network 120, the method 500 returns to step 505 until a connection is established.

In step 515, a determination is made whether a synchronization is to be performed with the cloud data. Although connected to the cloud network 120, the synchronization may only be performed upon an indication that this process is to be performed. For example, the user may select a setting that any time the station 200 is connected to the cloud network 120, an automatic synchronization is to be performed. In another example, the user may manually provide an input ad hoc for each time the station 200 is connected to the cloud network 120 that the synchronization is to be performed. If the synchronization is not to be performed, the method 500 returns to step 505.

In step 520, the cloud sync engine 225 converts the network data including the wireless network identities and the password keychain from the format utilized by the platform of the station 200 to the cloud format. In step 525, the network data stored locally in the memory arrangement 210 is transmitted to the cloud server 125 via the cloud network 120. Specifically, the wireless network identities of the network data is transmitted. Upon receiving the network data of the station 200, the cloud server 125 may compare the locally stored network data of the station 200 with the cloud data including the network data of the cloud network 120. The cloud server 125 may determine whether new wireless networks have been added or whether known wireless networks have been removed. Thus, in step 530, a determination is made whether wireless networks have been added or removed. It is noted that the following steps may be performed for each wireless network that has been added or removed.

If a new wireless network has been added, the method 500 continues to step 535. Steps 535-550 may be substantially similar to the steps described above with regard to the method 300 of FIG. 3 (steps 325-355) and the method 400 of FIG. 4 (steps 420-435). In step 535, the network data of the cloud data is updated such that the list of known wireless networks is updated to include the additional wireless networks determined based upon the locally stored network data. In step 540, a determination is made whether passwords are associated with the newly added wireless networks. If passwords exist, the method 500 continues to step 545. In step 545, the passwords for the newly added wireless networks are transmitted in a secured manner via the AirPortSync application. Again, the cloud sync engine 225 has converted the password keychain stored locally into the cloud format prior to transmission. In step 550, the passwords are added to the keychain.

Returning to step 530, if the cloud server 125 determines that a wireless network is to be removed, the method 500 continues to step 555. In step 555, the cloud server 125 determines the wireless network that is part of the network data of the cloud data that has been removed based upon the locally stored network data of the station 200. In step 560, the network data of the cloud data is updated such that the wireless network is removed from the list of known wireless networks stored in the cloud data. In step 565, a determination is made whether a password is associated with any of the removed wireless networks. If a password is associated therewith, the method 500 continues to step 570. In step 570, the cloud server 125 determines the portion of the keychain that corresponds to the password of the removed wireless network. In step 580, the keychain is updated such that the corresponding portion is removed.

The exemplary embodiments provide a system and method for synchronization of network data across a plurality of stations registered to a particular user. The synchronization of the network data includes synchronizing a list of known wireless networks and synchronizing authentication data associated with each of the known wireless networks. According to a first exemplary manner of synchronization, a station may connect to a cloud network administered by a cloud server connected to a cloud database that stores the cloud data. The station may receive the cloud data including the list of known wireless networks for synchronization. The station may also receive authentication data related to the list of known wireless networks using a secured transmission via an intermediary application in the form of a keychain. A cloud sync engine of the processor of the station may determine associations of the passwords stored in the keychain to the respective known wireless network of the list. According to a second exemplary manner of synchronization, a station may connect to the cloud network via an unknown wireless network. The station may store the identity and associated authentication data locally for this unknown wireless network. Once connected to the cloud network, the cloud server may determine whether this unknown wireless network is to be added to the network data of the cloud data. If determined to be included for synchronization, the cloud server stores the unknown wireless network into the list of known wireless networks and also stores the association authentication data by updating the keychain. According to a third exemplary manner of synchronization, a station may connect to the cloud network. The cloud server may determine various changes to be made to the cloud data including the network data based upon locally stored network data of the station. For example, the changes may include additions to the network list and associated authentication data or may include removals in the network list and associated authentication data.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described methods may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
receiving, by a server of a synchronization network, network data from a first station registered to a user, the network data including:
a list of a plurality of known wireless networks, wherein the known wireless networks include IEEE 802.11 networks, and wherein the list includes a plurality of service set identifiers (SSIDs), each SSID corresponding to a respective one of the known wireless networks, and
authentication data associated with each of the known wireless networks, wherein the authentication data includes a plurality of passwords, each password corresponding to a respective one of the known wireless networks;
determining, by the server, a second station registered to the user that is to be synchronized with the network data;
transmitting, by the server, the list of known wireless networks to the second station via the synchronization network;
generating a secured file including the authentication data, wherein the network data associated with each of the known wireless networks and the secured file include an attribute, the attribute indicating to an intermediary application that the known wireless networks and the secured file comprise data to be synchronized;
transmitting, by the server, the secured file including the authentication data to the second station via the synchronization network; and
transmitting, by the server, association data to the second station via the synchronization network, wherein the association data comprises data that associates each of the plurality of passwords with the corresponding known wireless network, wherein the association data is transmitted independent of the secured file.

2. The method of claim 1, wherein the list of known wireless networks is transmitted in a format utilized by the server such that the second station is configured to convert the list of known wireless networks into a format corresponding to a platform utilized by the second station.

3. The method of claim 1, further comprising:
storing the network data received from the first station.

4. The method of claim 3, further comprising:
determining a new wireless network from the network data received from the first station.

5. The method of claim 4, further comprising:
updating the list of known wireless networks by including the new wireless network to the list of known wireless networks; and
updating the secured file with respective authentication data of the new wireless network.

6. The method of claim 3, further comprising:
determining one of the known wireless networks is removed from the network data received from the first station.

7. The method of claim 6, further comprising:
updating the list of known wireless networks by removing the one of the known wireless networks; and
updating the secured file by removing the respective authentication data of the one of the known wireless networks.

8. The method of claim 1, wherein the secured file is a keychain including each password in which a first portion of the keychain is a respective password corresponding to a first one of the known wireless networks.

9. The method of claim 1, further comprising:
determining whether an unknown wireless network utilized by the second station to connect to the synchronization network is to be included in the list of known wireless networks.

10. The method of claim 1, further comprising:
receiving user identification data from the user, the user identification data being indicative of identities of the first and second stations.

11. A device, comprising:
a transceiver configured to communicate wireless data;
a processor;
wherein the processor and transceiver are configured to synchronize network data including a list of a plurality of known wireless networks and authentication data associated with each of the known wireless networks by:
establishing a connection to a server of a synchronization network;
transmitting identification data to the server, the identification data indicating the network data corresponding to a user to which the device is registered;
receiving the list of known wireless networks from the server via the synchronization network;
receiving a secure file including the authentication data from the server via the synchronization network, wherein the network data associated with each of the known wireless networks and the secured file include an attribute, the attribute indicating to an intermediary application that the known wireless networks and the secured file comprise data to be synchronized;
receiving association data via the synchronization network, wherein the association data comprises data that associates the authentication data with the corresponding known wireless network, wherein the association data is received independent of the secured file; and
a memory, wherein the processor is configured to store updated network data locally on the memory.

12. The device of claim 11, wherein the network data is generated by a further station registered to the user.

13. The device of claim 11, wherein the updated network data is transmitted to the server.

14. The device of claim 11, wherein the updated network data includes an addition of a wireless network.

15. The device of claim 11, wherein the updated network data includes a removal of a wireless network.

16. The device of claim 11, wherein the list of known wireless networks includes a plurality of service set identifiers (SSIDs) and the authentication data includes a plurality of passwords.

17. The device of claim 11, wherein the processor is configured to associate the authentication data with a corresponding one of the known wireless networks.

18. A non-transitory computer readable storage medium with an executable program stored thereon, wherein the program instructs a microprocessor to perform operations comprising:

storing network data that includes a list of a plurality of known wireless networks and authentication data associated with each of the known wireless networks;

determining a station that is to be synchronized with the network data;

transmitting the list of known wireless networks to the station via the synchronization network;

generating a secured file including the authentication data, wherein the network data associated with each of the known wireless networks and the secured file include an attribute, the attribute indicating to an intermediary application that the known wireless networks and the secured file comprise data to be synchronized;

transmitting the secured file including the authentication data to the station via the synchronization network; and transmitting association data to the station via the synchronization network, wherein the association data comprises data that associates the authentication data with the corresponding known wireless network, wherein the association data is transmitted independent of the secured file.

19. The method of claim 1, wherein the secured file is transmitted utilizing a higher standard of security than a standard of security utilized in the transmitting of the list of known wireless networks.

20. The method of claim 19, wherein the higher standard of security comprises a more secure synchronization.

* * * * *